(12) United States Patent
Wang et al.

(10) Patent No.: US 10,462,376 B2
(45) Date of Patent: Oct. 29, 2019

(54) EXPOSURE METHOD IN PANORAMIC PHOTO SHOOTING AND APPARATUS

(71) Applicant: Huawei Technologies Co., Ltd., Shenzhen (CN)

(72) Inventors: Yong Wang, Wuhan (CN); Yujie Chen, Wuhan (CN); Lin Yang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/546,959

(22) PCT Filed: Jan. 27, 2015

(86) PCT No.: PCT/CN2015/071649
§ 371 (c)(1),
(2) Date: Jul. 27, 2017

(87) PCT Pub. No.: WO2016/119126
PCT Pub. Date: Aug. 4, 2016

(65) Prior Publication Data
US 2018/0020141 A1    Jan. 18, 2018

(51) Int. Cl.
*H04N 5/235*    (2006.01)
*H04N 5/232*    (2006.01)
(Continued)

(52) U.S. Cl.
CPC .......... *H04N 5/2351* (2013.01); *G03B 37/02* (2013.01); *H04N 5/2356* (2013.01);
(Continued)

(58) Field of Classification Search
CPC ............... H04N 5/2351; H04N 5/2356; H04N 5/23238; H04N 5/2352; H04N 5/2353; G03B 37/02; G03B 2207/00
See application file for complete search history.

(56) References Cited

U.S. PATENT DOCUMENTS 5,717,965 A    2/1998  Iwasaki
9,172,889 B2 * 10/2015  Li ........................ H04N 5/2353
(Continued)

FOREIGN PATENT DOCUMENTS

CN    1851555 A    10/2006
CN    102932604 A    2/2013
(Continued)

OTHER PUBLICATIONS

Foreign Communication From a Counterpart Application, European Application No. 15879337.2, Extended European Search Report dated Dec. 13, 2017, 9 pages.
(Continued)

*Primary Examiner* — Luong T Nguyen
(74) *Attorney, Agent, or Firm* — Conley Rose, P.C.

(57) ABSTRACT

An exposure method in panoramic photo shooting to resolve a problem that luminance of a composite picture in panoramic photo shooting is not smooth, where the method includes obtaining, by a terminal device, luminance values respectively corresponding to M pictures shot in advance and a luminance value of a current environment in which shooting is to be performed, where M is a positive integer, obtaining, by the terminal device by means of calculation according to the luminance values respectively corresponding to the M pictures shot in advance and the luminance value of the current environment in which shooting is to be performed, a luminance value of a picture to be shot, and performing, by the terminal device, exposure according to the luminance value of the picture to be shot.

20 Claims, 4 Drawing Sheets

(51) Int. Cl.
*G03B 37/02* (2006.01)
*H04N 5/243* (2006.01)

(52) U.S. Cl.
CPC ..... *H04N 5/23238* (2013.01); *G03B 2207/00* (2013.01); *H04N 5/2352* (2013.01); *H04N 5/2353* (2013.01); *H04N 5/243* (2013.01)

(56) References Cited

U.S. PATENT DOCUMENTS

| | | | |
|---|---|---|---|
| 9,413,953 B2* | 8/2016 | Maeda | H04N 5/23238 |
| 2003/0067546 A1 | 4/2003 | Asano | |
| 2004/0027451 A1 | 2/2004 | Baker | |
| 2012/0249728 A1* | 10/2012 | Kato | H04N 1/3871 |
| | | | 348/36 |
| 2013/0208138 A1 | 8/2013 | Li et al. | |
| 2013/0222533 A1 | 8/2013 | Maeda | |
| 2015/0055888 A1* | 2/2015 | Shimizu | G06T 5/008 |
| | | | 382/294 |

FOREIGN PATENT DOCUMENTS

| | | |
|---|---|---|
| CN | 103428410 A | 12/2013 |
| JP | H08146483 A | 6/1996 |

OTHER PUBLICATIONS

Machine Translation and Abstract of Chinese Publication No. CN102932604, Feb. 13, 2013, 10 pages.
Foreign Communication From a Counterpart Application, Chinese Application No. 201580002363.1, Chinese Office Action dated Jul. 4, 2018, 6 pages.
Machine Translation and Abstract of Chinese Publication No. CN1851555, Oct. 25, 2006, 13 pages.
Machine Translation and Abstract of Chinese Publication No. CN103428410, Dec. 4, 2013, 10 pages.
Foreign Communication From a Counterpart Application, PCT Application No. PCT/CN2015/071649, English Translation of International Search Report dated Sep. 24, 2015, 2 pages.
Foreign Communication From a Counterpart Application, PCT Application No. PCT/CN2015/071649, English Translation of Written Opinion dated Sep. 24, 2015, 5 pages.

* cited by examiner

EXPOSURE METHOD IN PANORAMIC PHOTO SHOOTING AND APPARATUS

CROSS-REFERENCE TO RELATED APPLICATIONS

This application is a U.S. National Stage of International Patent Application No. PCT/CN2015/071649 filed Jan. 27, 2015, which is hereby incorporated by reference in its entirety.

TECHNICAL FIELD

The present disclosure relates to the panoramic photo shooting field, and in particular, to an exposure method in panoramic photo shooting and a terminal device.

BACKGROUND

With the advent of a digital era, a panoramic photo shooting technology has gradually matured. Panoramic photo shooting is to stitch multiple shot pictures into one panoramic picture. A basic shooting principle of panoramic photo shooting is that edge parts of two pictures are searched for, and areas whose imaging effects are closest to each other are overlapped such that automatic stitching of the pictures is completed.

At present, during panoramic photo shooting, there is no special control in an exposure aspect, and metering and exposure are performed in an actual environment. Multiple pictures are combined during panoramic photo shooting, a luminance value of each picture is independently tested, and each composite picture is independently exposed. Therefore, if a light-dark change of the outside is obvious, a light-dark change of the picture is obvious, that is, a luminance difference of the composite picture fluctuates. A large light-dark change exists in a composite panoramic picture. As a result, luminance of the composite picture is not smooth, and a visual effect of a user is affected.

SUMMARY

Embodiments of the present disclosure provide an exposure method in panoramic photo shooting and a terminal device to resolve a problem that luminance of a composite picture in panoramic photo shooting is not smooth, and to improve a visual effect of a user.

A first aspect of the present disclosure provides an exposure method in panoramic photo shooting, including obtaining, by a terminal device, luminance values respectively corresponding to M pictures shot in advance and a luminance value of a current environment in which shooting is to be performed, where M is a positive integer, obtaining, by the terminal device according to the luminance values respectively corresponding to the M pictures shot in advance and the luminance value of the current environment in which shooting is to be performed, a luminance value of a picture to be shot, and performing, by the terminal device, exposure according to the luminance value of the picture to be shot.

With reference to the first aspect, in a first possible implementation manner, before obtaining, by the terminal device according to the luminance values respectively corresponding to the M pictures shot in advance and the luminance value of the current environment in which shooting is to be performed, a luminance value of a picture to be shot, the method further includes obtaining, by the terminal device, a luminance value adjustment coefficient $\alpha$ and adjustment weights $\beta_i$ respectively corresponding to the M pictures shot in advance, where i is a positive integer, $0 \leq \alpha \leq 1$, and $0 \leq \beta_i \leq 1$.

With reference to the first possible implementation manner of the first aspect, in a second possible implementation manner, obtaining, by the terminal device according to the luminance values respectively corresponding to the M pictures shot in advance and the luminance value of the current environment in which shooting is to be performed, a luminance value of a picture to be shot includes obtaining, by the terminal device, B2 by means of calculation using a formula B2=B1−Δb, where the luminance value of the current environment in which shooting is to be performed is B1, the luminance value of the picture to be shot is B2, and a deviation coefficient is $\Delta b = (\text{total}\Delta B / \delta) \times \alpha$, where a total adjustment value is $$\text{total}\Delta B = \sum_{i=1}^{M} \beta_i (B1 - b_i),$$

the luminance values respectively corresponding to the M pictures shot in advance are $b_i$, i is a positive integer, and a total weight is $$\delta = \sum_{i=1}^{M} \beta_i.$$

With reference to any one of the first aspect, or the first to the second possible implementation manners of the first aspect, in a third possible implementation manner, before obtaining, by the terminal device according to the luminance values respectively corresponding to the M pictures shot in advance and the luminance value of the current environment in which shooting is to be performed, a luminance value of a picture to be shot, the method further includes determining, by the terminal device, a difference between the luminance value of the current environment in which shooting is to be performed and a luminance value corresponding to any one of the M pictures shot in advance, and obtaining, by the terminal device according to the luminance values respectively corresponding to the M pictures shot in advance and the luminance value of the current environment in which shooting is to be performed, a luminance value of a picture to be shot includes determining, by the terminal device, the luminance value of the current environment in which shooting is to be performed as the luminance value of the picture to be shot when the difference falls within a threshold range preset by the terminal device.

A second aspect of the present disclosure provides a terminal device, including a first obtaining module configured to obtain luminance values respectively corresponding to M pictures shot in advance and a luminance value of a current environment in which shooting is to be performed, where M is a positive integer, a second obtaining module configured to obtain, according to the luminance values respectively corresponding to the M pictures shot in advance and the luminance value of the current environment in which shooting is to be performed that are obtained by the first obtaining module, a luminance value of a picture to be shot, and an exposure module configured to perform exposure according to the luminance value, obtained by the second obtaining module, of the picture to be shot.

With reference to the second aspect, in a first possible implementation manner, the terminal device further includes a third obtaining module configured to obtain a luminance value adjustment coefficient $\alpha$ and adjustment weights $\beta^i$ respectively corresponding to the M pictures shot in advance, where i is a positive integer, $0 \le \alpha \le 1$, and $0 \le \beta_i \le 1$.

With reference to the first possible implementation manner of the second aspect, in a second possible implementation manner, the second obtaining module includes a calculation unit configured to obtain B2 by means of calculation using a formula $B2=B1-\Delta b$, where the luminance value of the current environment in which shooting is to be performed is B1, the luminance value of the picture to be shot is B2, and a deviation coefficient is $\Delta b = (\text{total}\Delta B/\delta) \times \alpha$, where a total adjustment value is $$\text{total}\Delta B = \sum_{i=1}^{M} \beta_i (B1 - b_i),$$

the luminance values respectively corresponding to the M pictures shot in advance are $b_i$, i is a positive integer, and a total weight is $$\delta = \sum_{i=1}^{M} \beta_i.$$

With reference to any one of the second aspect, or the first to the second possible implementation manners of the second aspect, in a third possible implementation manner, the terminal device further includes a judging module configured to determine a difference between the luminance value of the current environment in which shooting is to be performed and a luminance value corresponding to any one of the M pictures shot in advance, where the second obtaining module includes a determining unit, where the determining unit is configured to determine the luminance value of the current environment in which shooting is to be performed as the luminance value of the picture to be shot when the difference falls within a threshold range preset by the terminal device.

A third aspect of the present disclosure provides a terminal device, including a memory, a processor, and a bus, where the memory and the processor are connected to the bus, the memory is configured to store a program, and the processor is configured to invoke the program to perform the following operations of obtaining, by the processor, luminance values respectively corresponding to M pictures shot in advance and a luminance value of a current environment in which shooting is to be performed, where M is a positive integer, obtaining, by the processor according to the luminance values respectively corresponding to the M pictures shot in advance and the luminance value of the current environment in which shooting is to be performed, a luminance value of a picture to be shot, and performing, by the processor, exposure according to the luminance value of the picture to be shot.

With reference to the third aspect, in a first possible implementation manner, before the obtaining, by the processor according to the luminance values respectively corresponding to the M pictures shot in advance and the luminance value of the current environment in which shooting is to be performed, a luminance value of a picture to be shot, the operations further include obtaining, by the processor, a luminance value adjustment coefficient $\alpha$ and adjustment weights $\beta_i$ respectively corresponding to the M pictures shot in advance, where i is a positive integer, $0 \le \alpha \le 1$, and $0 \le \beta_i \le 1$.

With reference to the first possible implementation manner of the third aspect, in a second possible implementation manner, obtaining, by the processor according to the luminance values respectively corresponding to the M pictures shot in advance and the luminance value of the current environment in which shooting is to be performed, a luminance value of a picture to be shot includes obtaining, by the processor, B2 by means of calculation using a formula $B2=B1-\Delta b$, where the luminance value of the current environment in which shooting is to be performed is B1, the luminance value of the picture to be shot is B2, and a deviation coefficient is $\Delta b = (\text{total}\Delta B/\delta) \times \alpha$, where a total adjustment value is $$\text{total}\Delta B = \sum_{i=1}^{M} \beta_i (B1 - b_i),$$

the luminance values respectively corresponding to the M pictures shot in advance are $b_i$, i is a positive integer, and a total weight is $$\delta = \sum_{i=1}^{M} \beta_i.$$

With reference to any one of the third aspect, or the first to the second possible implementation manners of the third aspect, in a third possible implementation manner, before obtaining, by the processor according to the luminance values respectively corresponding to the M pictures shot in advance and the luminance value of the current environment in which shooting is to be performed, a luminance value of a picture to be shot, the operations further include determining, by the processor, a difference between the luminance value of the current environment in which shooting is to be performed and a luminance value corresponding to any one of the M pictures shot in advance, and obtaining, by the processor according to the luminance values respectively corresponding to the M pictures shot in advance and the luminance value of the current environment in which shooting is to be performed, a luminance value of a picture to be shot includes when the difference falls within a threshold range preset by the processor, determining, by the processor, the luminance value of the current environment in which shooting is to be performed as the luminance value of the picture to be shot.

Using the foregoing technical solutions, because multiple pictures are combined in panoramic photo shooting, after shooting a first picture, a terminal device obtains, according to a luminance value of the first picture and a luminance value of a current environment in which a second picture is to be shot, a luminance value of the second picture to be shot, and performs exposure according to the obtained luminance value of the second picture to be shot. In a subsequent shooting process, the terminal device obtains, according to luminance values respectively corresponding to several pictures previously shot and a luminance value of a current environment in which shooting is to be performed, a luminance value of a picture to be shot, and performs exposure according to the obtained luminance value of the picture to be shot. Therefore, pictures obtained after exposure have a similar or same luminance value such that luminance of a composite picture in panoramic photo shooting is smooth, and a visual effect of a user is improved.

DESCRIPTION OF EMBODIMENTS

Embodiments of the present disclosure provide an exposure method in panoramic photo shooting and a terminal device to resolve a problem that luminance of a composite picture in panoramic photo shooting is not smooth, and to improve a visual effect of a user.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons skilled in the art based on the embodiments of the present disclosure without creative efforts shall fall within the protection scope of the present disclosure.

In the embodiments of the present disclosure, the exposure method in panoramic photo shooting may be widely applied to various terminal devices with a camera lens, such as a camera, a video camera, a smartphone, and a tablet computer. It should be noted that, in an actual application process, the exposure method in panoramic photo shooting may also be applied to another similar panoramic photo shooting apparatus, which is not limited herein.

Figure 1:
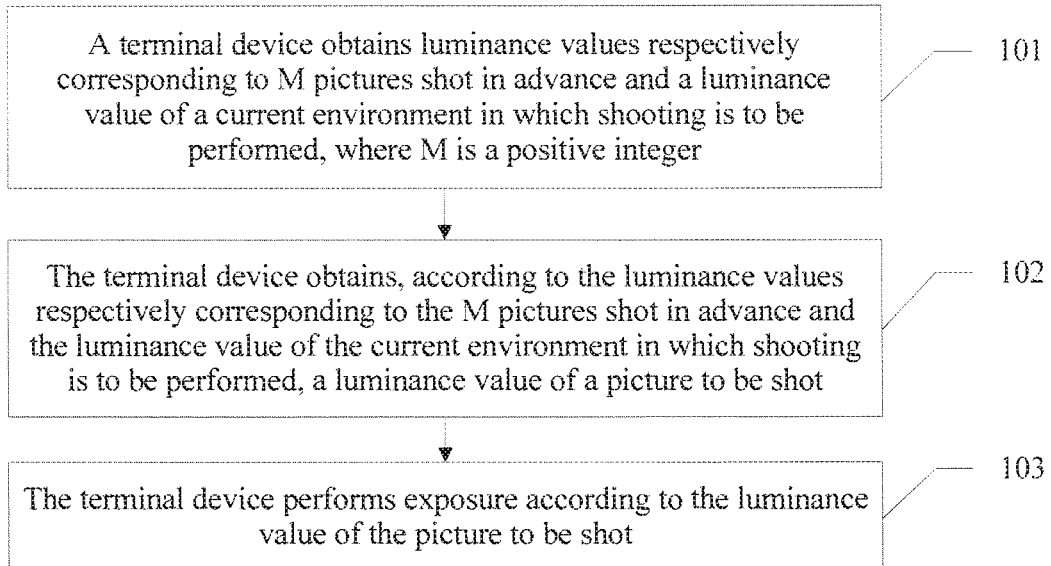
FIG. 1 is a schematic flowchart diagram of an embodiment of an exposure method in panoramic photo shooting according to an embodiment of the present disclosure.

Referring to FIG. 1, an embodiment of an exposure method in panoramic photo shooting in the embodiments of the present disclosure includes the following steps.

Step 101: A terminal device obtains luminance values respectively corresponding to M pictures shot in advance and a luminance value of a current environment in which shooting is to be performed, where M is a positive integer.

In this embodiment of the present disclosure, for example, the terminal device obtains in advance a luminance value of a first picture required in panoramic photo shooting, and the luminance value of the first picture is a luminance value of an actual environment. When shooting a second picture required in the panoramic photo shooting, the terminal device first obtains the luminance value of the first picture and a luminance value of a current environment in which the second picture is to be shot. When shooting a third picture required in the panoramic photo shooting, the terminal device first obtains the luminance value of the first picture, a luminance value of the second picture, and a luminance value of a current environment in which the third picture is to be shot, and so on.

It should be noted that the luminance value of the current environment in which shooting is to be performed may be obtained by measurement using a sensor of the terminal device, which is not limited herein.

Step 102: The terminal device obtains, according to the luminance values respectively corresponding to the M pictures shot in advance and the luminance value of the current environment in which shooting is to be performed, a luminance value of a picture to be shot.

In this embodiment of the present disclosure, to make luminance of a composite picture in panoramic photo shooting smooth, a luminance value of a subsequent picture is correspondingly corrected after a first picture required in panoramic photo shooting is obtained by shooting.

Step 103: The terminal device performs exposure according to the luminance value of the picture to be shot.

In this embodiment of the present disclosure, the terminal device separately corrects a luminance value of another picture after the first picture required in panoramic photo shooting, and performs exposure according to a corrected luminance value.

In this embodiment of the present disclosure, exposure is a process in which a photosensitive material absorbs light. After several pictures required in panoramic photo shooting are separately exposed, a final panoramic picture is obtained by combination. When a first picture is being shot, exposure is performed according to a luminance value of an actual environment, and in a subsequent shooting process, exposure is performed according to a corrected luminance value of a picture to be shot such that pictures obtained after exposure have a same or similar luminance value. That pictures have a similar luminance value may mean that a difference between luminance values of the pictures is less than a threshold.

In this embodiment of the present disclosure, because multiple pictures are combined in panoramic photo shooting, after shooting a first picture, a terminal device may obtain, according to a luminance value of the first picture and a luminance value of a current environment in which a second picture is to be shot, a luminance value of the second picture to be shot, and perform exposure according to the obtained luminance value of the second picture to be shot. In a subsequent shooting process, the terminal device may obtain, according to luminance values respectively corresponding to several pictures previously shot and a luminance value of a current environment in which shooting is to be performed, a luminance value of a picture to be shot, and perform exposure according to the obtained luminance value of the picture to be shot. Therefore, pictures obtained after exposure have a similar or same luminance value such that luminance of a composite picture in panoramic photo shooting is smooth, and a visual effect of a user is improved.

Figure 2:
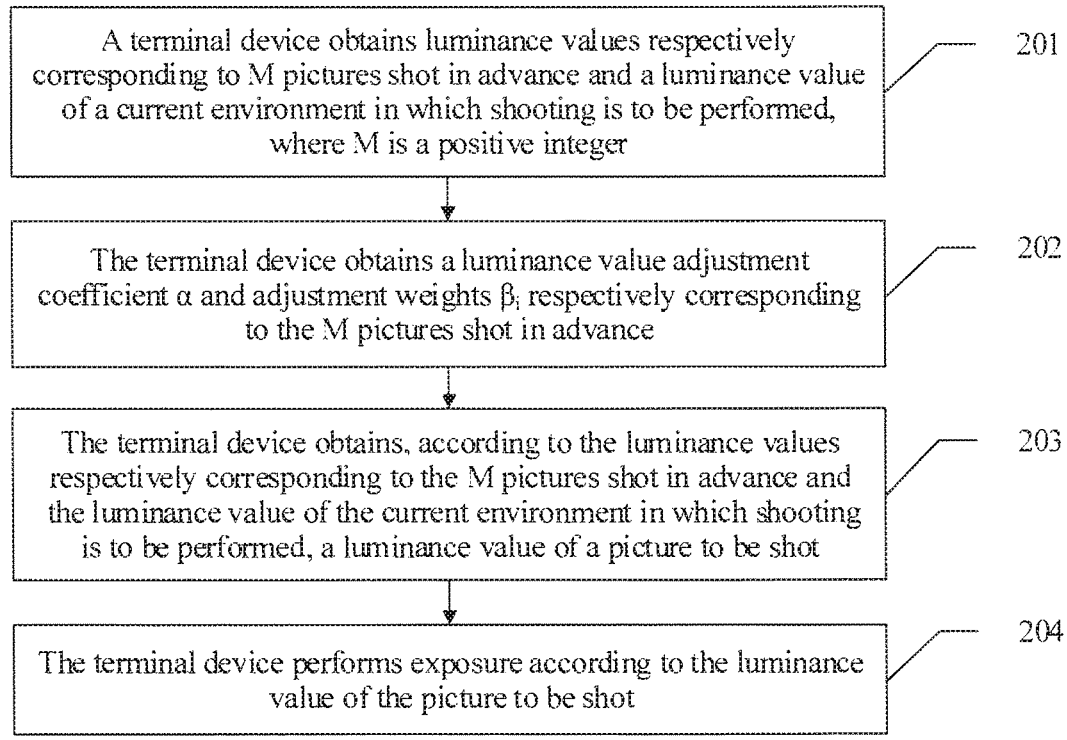
FIG. 2 is a schematic flowchart diagram of another embodiment of an exposure method in panoramic photo shooting according to an embodiment of the present disclosure.

Based on the embodiment shown in FIG. 1, the following further describes the exposure method in panoramic photo shooting. Referring to FIG. 2, another embodiment of an exposure method in panoramic photo shooting in the embodiments of the present disclosure includes the following steps.

Step 201: A terminal device obtains luminance values respectively corresponding to M pictures shot in advance and a luminance value of a current environment in which shooting is to be performed, where M is a positive integer.

In this embodiment, a process of step 201 is the same as a process of step 101 in the embodiment shown in FIG. 1, and details are not described herein again.

Step 202: The terminal device obtains a luminance value adjustment coefficient α and adjustment weights $\beta_i$ respectively corresponding to the M pictures shot in advance.

In the present disclosure, i is a positive integer, $0 \leq \alpha \leq 1$, and $0 \leq \beta_i \leq 1$.

In this embodiment of the present disclosure, the luminance value adjustment coefficient α may be set according to a user requirement, and the value is used to coordinate luminance values of correlated pictures. A smaller α indicates that adjustment to a luminance value of a picture is less obvious. When α is the smallest, luminance of the pictures do not affect each other (that is, an adjustment function of α does not work), and a luminance value of a current environment in which shooting is to be performed is determined as a luminance value of a picture to be shot. A larger α indicates that adjustment is more obvious. When α is the largest, the luminance values of the pictures are the same (that is, are kept the same as a luminance value of a first picture).

In the present disclosure, the adjustment weights $\beta^i$ respectively corresponding to the M pictures shot in advance are preset by the terminal device, that is, the terminal device presets, before shooting, adjustment weights of all pictures required in panoramic photo shooting. When a second picture is being shot, that is, M is equal to 1, the adjustment weights respectively corresponding to the M pictures shot in advance refer to an adjustment weight corresponding to a first picture.

It should be noted that a sequence of step 201 and step 202 is not limited.

Step 203: The terminal device obtains, according to the luminance values respectively corresponding to the M pictures shot in advance and the luminance value of the current environment in which shooting is to be performed, a luminance value of a picture to be shot.

In this embodiment of the present disclosure, in order to make luminance of a composite picture in panoramic photo shooting smooth, a luminance value of a subsequent picture is correspondingly corrected after a first picture required in panoramic photo shooting is shot.

Optionally, the terminal device obtains B2 by means of calculation using a formula B2=B1−Δb, where the luminance value of the current environment in which shooting is to be performed is B1, the luminance value of the picture to be shot is B2, and a deviation coefficient is Δb=(totalΔB/δ)×α, where a total adjustment value is $$\text{total}\Delta B = \sum_{i=1}^{M} \beta_i (B1 - b_i),$$

the luminance values respectively corresponding to the M pictures shot in advance are $b_i$, i is a positive integer, and a total weight is $$\delta = \sum_{i=1}^{M} \beta_i.$$

It may be understood that, when α is 1, the adjustment coefficient is the largest, and for all subsequent pictures, a luminance value of a first picture is used as a luminance value of a picture to be shot, and when α is 0, the adjustment coefficient is the smallest, and for a subsequent picture, a luminance value of a current environment in which shooting is to be performed is used as a luminance value of a picture to be shot, and adjustment of a luminance value is not performed.

Step 204: The terminal device performs exposure according to the luminance value of the picture to be shot.

In this embodiment of the present disclosure, the terminal device separately corrects a luminance value of another picture after the first picture required in panoramic photo shooting, and performs exposure according to a corrected luminance value.

In this embodiment of the present disclosure, exposure is a process in which a photosensitive material absorbs light. After several pictures required in panoramic photo shooting are separately exposed, a final panoramic picture is obtained by combination. When a first picture is being shot, exposure is performed according to a luminance value of an actual environment, and in a subsequent shooting process, exposure is performed according to a corrected luminance value of a picture to be shot such that pictures obtained after exposure have a same or similar luminance value. That pictures have a similar luminance value may mean that a difference between luminance values of the pictures is less than a threshold.

In this embodiment of the present disclosure, because multiple pictures are combined in panoramic photo shooting, after shooting a first picture, a terminal device obtains, according to an actual requirement of a user and according to a luminance value of the first picture and a luminance value of a current environment in which a second picture is to be shot, a luminance value of the second picture to be shot, and performs exposure according to the obtained luminance value of the second picture to be shot. In a subsequent shooting process, the terminal device may obtain, according to luminance values respectively corresponding to several pictures previously shot and a luminance value of a current environment in which shooting is to be performed, a luminance value of a picture to be shot, and perform exposure according to the obtained luminance value of the picture to be shot. Therefore, a composite picture in panoramic photo shooting satisfies the actual requirement of the user, and user satisfaction is improved.

Figure 3:
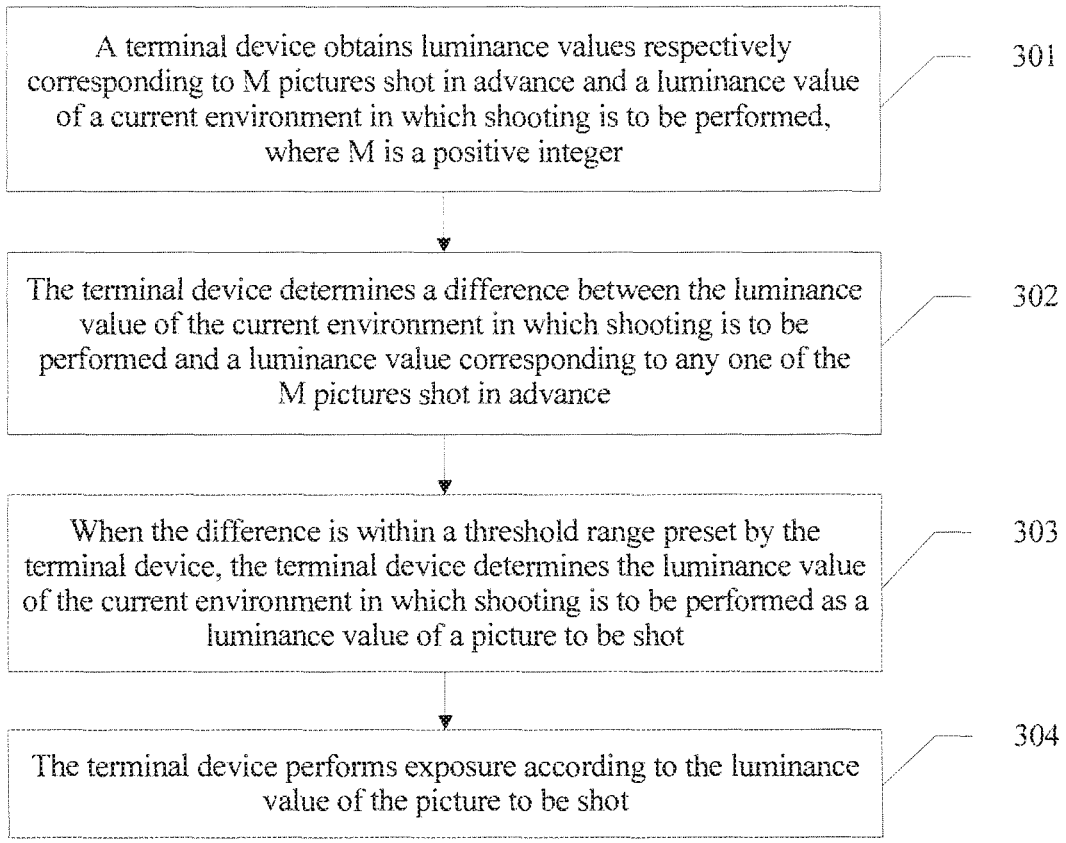
FIG. 3 is a schematic flowchart diagram of another embodiment of an exposure method in panoramic photo shooting according to an embodiment of the present disclosure.

Based on the embodiment shown in FIG. 2, the following further describes the exposure method in panoramic photo shooting. Referring to FIG. 3, another embodiment of an exposure method in panoramic photo shooting in the embodiments of the present disclosure includes the following steps.

Step 301: A terminal device obtains luminance values respectively corresponding to M pictures shot in advance and a luminance value of a current environment in which shooting is to be performed, where M is a positive integer.

In this embodiment, a process of step 301 is the same as a process of step 101 in the embodiment shown in FIG. 1, and details are not described herein again.

Step 302: The terminal device determines a difference between the luminance value of the current environment in which shooting is to be performed and a luminance value corresponding to any one of the M pictures shot in advance.

Step 303: When the difference falls within a threshold range preset by the terminal device, the terminal device determines the luminance value of the current environment in which shooting is to be performed as a luminance value of a picture to be shot.

It should be noted that the threshold range preset by the terminal device may be set according to an actual requirement of a user, which is not limited herein.

In an optional implementation manner, in a shooting process after the terminal device shoots a first picture, if a difference between the obtained luminance value of the current environment in which shooting is to be performed and a luminance value of the first picture falls within the threshold range preset by the terminal device, the luminance value of the picture to be shot does not need to be corrected, and the luminance value of the current environment in which shooting is to be performed is directly determined as the luminance value of the picture to be shot.

In another optional implementation manner, in a subsequent shooting process of the terminal device, if a difference between the obtained luminance value of the current environment in which shooting is to be performed and a luminance value of a picture prior to the picture to be shot (except a first picture) falls within the threshold range preset by the terminal device, the luminance value of the picture to be shot does not need to be corrected, and the luminance value of the current environment in which shooting is to be performed is directly determined as the luminance value of the picture to be shot.

Step 304: The terminal device performs exposure according to the luminance value of the picture to be shot.

In this embodiment of the present disclosure, exposure is a process in which a photosensitive material absorbs light. After several pictures required in panoramic photo shooting are separately exposed, a final panoramic picture is obtained by combination. When a first picture is being shot, exposure is performed according to a luminance value of an actual environment, and in a subsequent shooting process, exposure is performed according to a corrected luminance value of a picture to be shot such that pictures obtained after exposure have a same or similar luminance value. That pictures have a similar luminance value may mean that a difference between luminance values of the pictures is less than a threshold.

In this embodiment of the present disclosure, because multiple pictures are combined in panoramic photo shooting, after shooting a first picture, a terminal device obtains, according to a luminance value of the first picture and a luminance value of a current environment in which a second picture is to be shot, a luminance value of the second picture to be shot, and performs exposure according to the obtained luminance value of the second picture to be shot. In a subsequent shooting process, the terminal device may obtain, according to luminance values respectively corresponding to several pictures previously shot and a luminance value of a current environment in which shooting is to be performed, a luminance value of a picture to be shot, and perform exposure according to the obtained luminance value of the picture to be shot. Therefore, pictures obtained after exposure have a similar or same luminance value such that luminance of a composite picture in panoramic photo shooting is smooth, and a visual effect of a user is improved.

Figure 4:
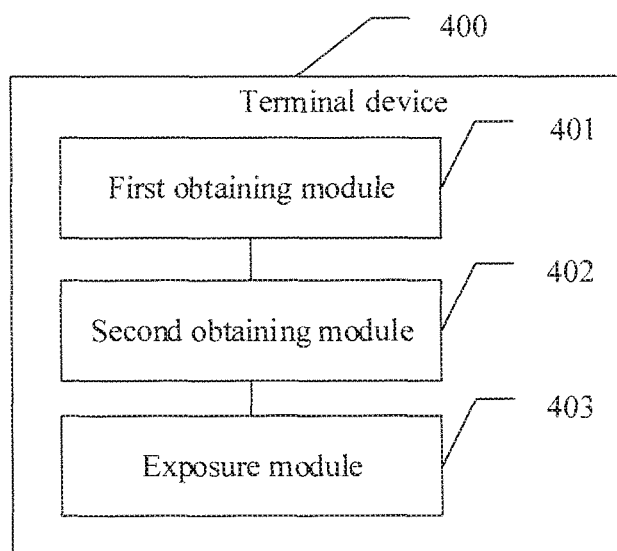
FIG. 4 is a schematic diagram of an embodiment of a terminal device according to an embodiment of the present disclosure.

The foregoing describes the exposure method in panoramic photo shooting in the embodiments of the present disclosure, and the following describes a terminal device in the embodiments of the present disclosure. Referring to FIG. 4, an embodiment of a terminal device 400 in the embodiments of the present disclosure includes a first obtaining module 401 configured to obtain luminance values respectively corresponding to M pictures shot in advance and a luminance value of a current environment in which shooting is to be performed, where M is a positive integer, a second obtaining module 402 configured to obtain, according to the luminance values respectively corresponding to the M pictures shot in advance and the luminance value of the current environment in which shooting is to be performed that are obtained by the first obtaining module 401, a luminance value of a picture to be shot, and an exposure module 403 configured to perform exposure according to the luminance value, obtained by the second obtaining module 402, of the picture to be shot.

In this embodiment of the present disclosure, because multiple pictures are combined in panoramic photo shooting, after the terminal device 400 shoots a first picture, the second obtaining module 402 obtains, according to a luminance value of the first picture and a luminance value of a current environment in which a second picture is to be shot, a luminance value of the second picture to be shot, and the exposure module 403 performs exposure according to the obtained luminance value of the second picture to be shot. In a subsequent shooting process, the second obtaining module 402 obtains, according to luminance values respectively corresponding to several pictures previously shot and a luminance value of a current environment in which shooting is to be performed, a luminance value of a picture to be shot, and the exposure module 403 performs exposure according to the obtained luminance value of the picture to be shot. Therefore, pictures obtained after exposure have a similar or same luminance value such that luminance of a composite picture in panoramic photo shooting is smooth, and a visual effect of a user is improved.

Based on the embodiment shown in FIG. 4, the following describes a specific structure of the terminal device. Further, referring to FIG. 5, another embodiment of a terminal device 500 in the embodiments of the present disclosure includes the following modules.

A first obtaining module 501 is configured to obtain luminance values respectively corresponding to M pictures shot in advance and a luminance value of a current environment in which shooting is to be performed, where M is a positive integer.

A third obtaining module 502 is configured to obtain a luminance value adjustment coefficient $\alpha$ and adjustment weights $\beta_i$ respectively corresponding to the M pictures shot in advance, where i is a positive integer, $0 \leq \alpha \leq 1$, and $0 \leq \beta_i \leq 1$.

A second obtaining module 503 is configured to obtain, according to the luminance values respectively corresponding to the M pictures shot in advance and the luminance value of the current environment in which shooting is to be performed, a luminance value of a picture to be shot.

Optionally, the second obtaining module 503 includes a calculation unit 5031.

The calculation unit 5031 is configured to obtain B2 by means of calculation using a formula $B2=B1-\Delta b$, where the luminance value of the current environment in which shooting is to be performed is B1, the luminance value of the picture to be shot is B2, and a deviation coefficient is $\Delta b=(\text{total}\Delta B/\delta)\times\alpha$, where a total adjustment value is $$\text{total}\Delta B = \sum_{i=1}^{M} \beta_i (B1 - b_i),$$

the luminance values respectively corresponding to the M pictures shot in advance are $b_i$, i is a positive integer, and a total weight is $$\delta = \sum_{i=1}^{M} \beta_i.$$

The exposure module 504 is configured to perform exposure according to the luminance value, obtained by the calculation unit 5031 by means of calculation, of the picture to be shot.

In this embodiment of the present disclosure, because multiple pictures are combined in panoramic photo shooting, after the terminal device 500 shoots a first picture, the second obtaining module 503 obtains, according to an actual requirement of a user and according to a luminance value of the first picture and a luminance value of a current environment in which a second picture is to be shot, a luminance value of the second picture to be shot, and the exposure module 504 performs exposure according to the obtained luminance value of the second picture to be shot. In a subsequent shooting process, the second obtaining module 503 obtains, according to luminance values respectively corresponding to several pictures previously shot and a luminance value of a current environment in which shooting is to be performed, a luminance value of a picture to be shot, and the exposure module 504 performs exposure according to the obtained luminance value of the picture to be shot. Therefore, a composite picture in panoramic photo shooting satisfies the actual requirement of the user, and user satisfaction is improved.

Figure 5:
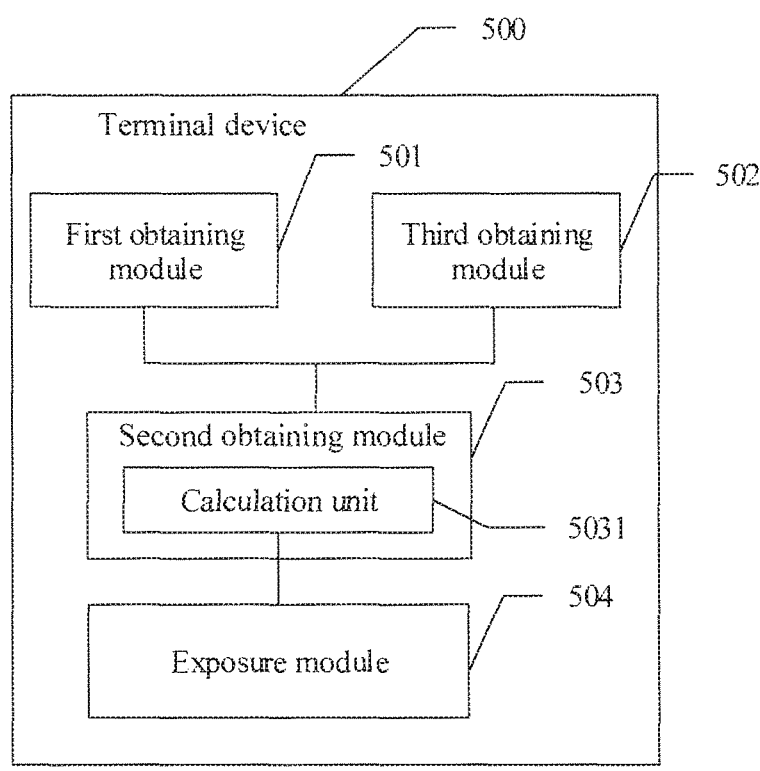
FIG. 5 is a schematic diagram of another embodiment of a terminal device according to an embodiment of the present disclosure.
Figure 6:
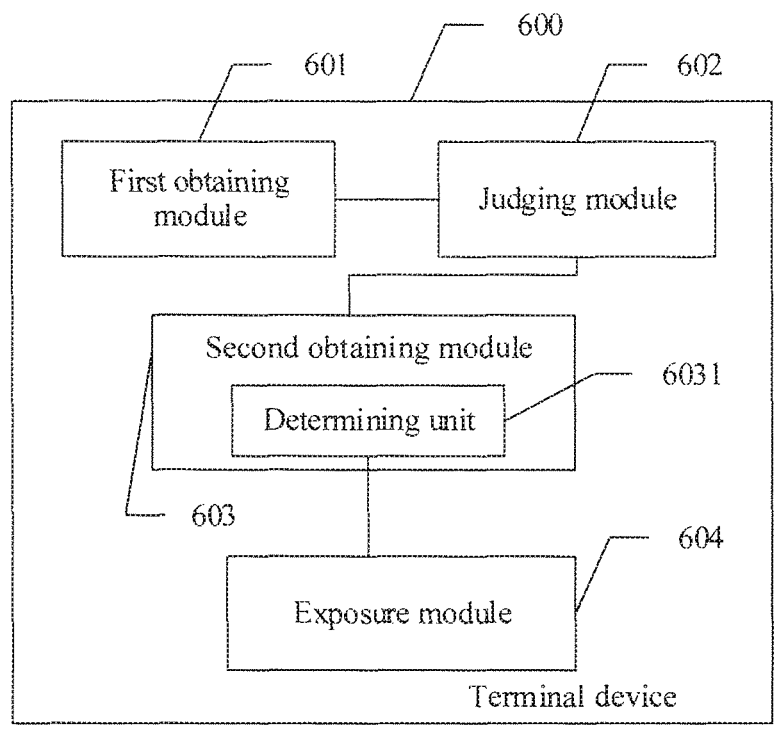
FIG. 6 is a schematic diagram of another embodiment of a terminal device according to an embodiment of the present disclosure.

Based on the embodiment shown in FIG. 5, the following further describes the terminal device. Referring to FIG. 6, another embodiment of a terminal device 600 in the embodiments of the present disclosure includes a first obtaining module 601, a judging module 602, a second obtaining module 603, and an exposure module 604.

The first obtaining module 601 is configured to obtain luminance values respectively corresponding to M pictures shot in advance and a luminance value of a current environment in which shooting is to be performed, where M is a positive integer.

The judging module 602 is configured to determine a difference between the luminance value of the current environment in which shooting is to be performed and a luminance value corresponding to any one of the M pictures shot in advance.

The second obtaining module 603 is configured to obtain, according to the luminance values respectively corresponding to the M pictures shot in advance and the luminance value of the current environment in which shooting is to be performed that are obtained by the first obtaining module 601, a luminance value of a picture to be shot.

Optionally, the second obtaining module 603 includes a determining unit 6031.

The determining unit 6031 is configured to determine the luminance value of the current environment in which shooting is to be performed as the luminance value of the picture to be shot when the difference determined by the judging module 602 falls within a threshold range preset by the terminal device 600.

The exposure module 604 is configured to perform exposure according to the luminance value, obtained by the second obtaining module 603, of the picture to be shot.

In this embodiment of the present disclosure, because multiple pictures are combined in panoramic photo shooting, after the terminal device 600 shoots a first picture, a second obtaining module 603 obtains, according to a luminance value of the first picture and a luminance value of a current environment in which a second picture is to be shot, a luminance value of the second picture to be shot, and an exposure module 604 performs exposure according to the obtained luminance value of the second picture to be shot. In a subsequent shooting process, the second obtaining module 603 may obtain, according to luminance values respectively corresponding to several pictures previously shot and a luminance value of a current environment in which shooting is to be performed, a luminance value of a picture to be shot, and the exposure module 604 performs exposure according to the obtained luminance value of the picture to be shot. Therefore, pictures obtained after exposure have a similar or same luminance value such that luminance of a composite picture in panoramic photo shooting is smooth, and a visual effect of a user is improved.

Figure 7:
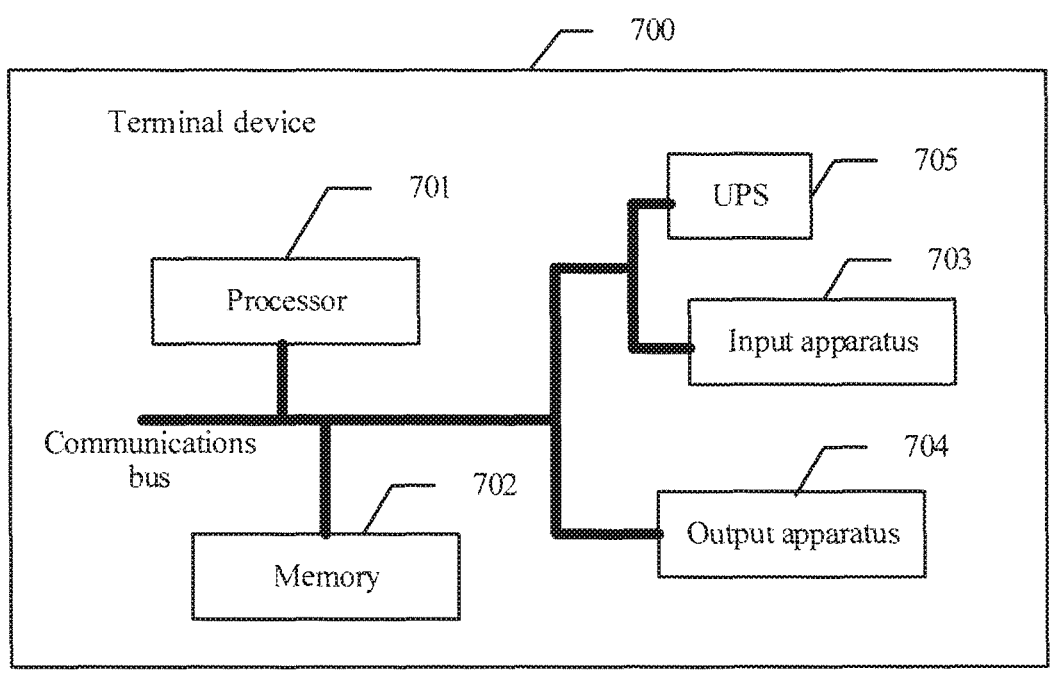
FIG. 7 is a schematic diagram of another embodiment of a terminal device according to an embodiment of the present disclosure.

The foregoing describes the terminal device in the embodiments of the present disclosure from a perspective of a modular function entity, and the following describes the terminal device in the embodiments of the present disclosure from a perspective of hardware processing. Referring to FIG. 7, another embodiment of a terminal device 700 in the embodiments of the present disclosure includes the following.

Referring to FIG. 7, FIG. 7 is a schematic structural diagram of the terminal device 700 provided in this embodiment of the present disclosure, where the terminal device 700 may include at least one processor 701 (such as a Central Processing Unit (CPU)), a memory 702, at least one communications bus, at least one input apparatus 703, at least one output apparatus 704, and an uninterruptible power system (UPS) 705, which is configured to implement connection and communication between these apparatuses. The processor 701 is configured to execute an executable module such as a computer program stored in the memory 702. The memory 702 may include a high-speed random access memory (RAM), or may further include a non-volatile memory, such as at least one magnetic disk memory. The at least one input apparatus 703 includes at least one camera lens. The at least one output apparatus 704 includes but is not limited to an image output unit (not shown). The image output unit is configured to output a character, a picture, and/or a video. The image output unit may include a display panel, for example, a display panel configured in a form of a liquid crystal display (LCD), an organic light-emitting diode (OLED), a field emission display (FED), and the like. Alternatively, the image output unit may include a reflective display, for example, an electrophoretic display or a display that uses an interferometric modulation of light technology. The image output unit may include a single display or multiple displays in different sizes.

As shown in FIG. 7, in some implementation manners, the memory 702 is configured to store a program, and the processor 701 is configured to invoke the program to perform the operations of obtaining, by the processor 701, luminance values respectively corresponding to M pictures shot in advance and a luminance value of a current environment in which shooting is to be performed, where M is a positive integer, obtaining, by the processor 701 according to the luminance values respectively corresponding to the M pictures shot in advance and the luminance value of the current environment in which shooting is to be performed, a luminance value of a picture to be shot, and performing, by the processor 701, exposure according to the luminance value of the picture to be shot.

Optionally, before obtaining, by the processor 701 according to the luminance values respectively corresponding to the M pictures shot in advance and the luminance value of the current environment in which shooting is to be performed, a luminance value of a picture to be shot, the operations further include obtaining, by the processor 701, a luminance value adjustment coefficient $\alpha$ and adjustment weights $\beta_i$ respectively corresponding to the M pictures shot in advance, where i is a positive integer, $0 \le \alpha \le 1$, and $0 \le \beta_i \le 1$.

Optionally, obtaining, by the processor 701 according to the luminance values respectively corresponding to the M pictures shot in advance and the luminance value of the current environment in which shooting is to be performed, a luminance value of a picture to be shot includes obtaining, by the processor 701, B2 by means of calculation using a formula $B2=B1-\Delta b$, where the luminance value of the current environment in which shooting is to be performed is B1, the luminance value of the picture to be shot is B2, and a deviation coefficient is $\Delta b = (\text{total}\Delta B / \delta) \times \alpha$, where a total adjustment value is $$\text{total}\Delta B = \sum_{i=1}^{M} \beta_i (B1 - b_i),$$

the luminance values respectively corresponding to the M pictures shot in advance are $b_i$, i is a positive integer, and a total weight is $$\delta = \sum_{i=1}^{M} \beta_i.$$

Optionally, obtaining, by the processor 701 according to the luminance values respectively corresponding to the M pictures shot in advance and the luminance value of the current environment in which shooting is to be performed, a luminance value of a picture to be shot includes determining, by the processor 701, a difference between the luminance value of the current environment in which shooting is to be performed and a luminance value corresponding to any one of the M pictures shot in advance, and determining, by the processor 701, the luminance value of the current environment in which shooting is to be performed as the luminance value of the picture to be shot when the difference falls within a threshold range preset by the processor 701.

It can be learned from the foregoing description that, because multiple pictures are combined in panoramic photo shooting, after shooting a first picture, a terminal device obtains, according to a luminance value of the first picture and a luminance value of a current environment in which a second picture is to be shot, a luminance value of the second picture to be shot, and performs exposure according to the obtained luminance value of the second picture to be shot. In a subsequent shooting process, the terminal device obtains, according to luminance values respectively corresponding to several pictures previously shot and a luminance value of a current environment in which shooting is to be performed, a luminance value of a picture to be shot, and performs exposure according to the obtained luminance value of the picture to be shot. Therefore, pictures obtained after exposure have a similar or same luminance value such that luminance of a composite picture in panoramic photo shooting is smooth, and a visual effect of a user is improved.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

The invention claimed is:

1. An exposure method in panoramic photo shooting, comprising:
   obtaining, by a terminal device, luminance values respectively corresponding to one or more pictures shot in advance and a luminance value of a current environment in which shooting is to be performed;
   obtaining a luminance value adjustment coefficient α and adjustment weights $\beta_i$ respectively corresponding to the one or more pictures shot M advance, wherein i is a positive integer;
   obtaining, by the terminal device according to the luminance values respectively corresponding to the one or more pictures shot in advance and the luminance value of the current environment in which shooting is to be performed, a luminance value of a picture to be shot, wherein the luminance value of the picture to he shot is obtained using a difference between the luminance value of the current environment in which shooting is to be performed and a deviation coefficient that is based at least in part on the luminance value adjustment coefficient α and the adjustment weight $\beta_i$; and
   performing, by the terminal device, exposure according to the luminance value of the picture to be shot.

2. The exposure method of claim 1, wherein $0 \leq \alpha \leq 1$, and wherein $0 \leq \beta_i \leq 1$.

3. The exposure method of claim 2, wherein obtaining the luminance value of the picture to be shot comprises obtaining, by the terminal device, B2 by calculation using a formula B2=B1−Δb, wherein the luminance value of the current environment in which shooting is to be performed is B1, wherein the luminance value of the picture to be shot is B2, wherein the deviation coefficient is Δb=(totalΔB/δ)×α, wherein a total adjustment value is $$\text{total}\Delta B = \sum_{i=1}^{M} \beta_i (B1 - b_i),$$

wherein the luminance values respectively corresponding to the one or more pictures shot in advance are $b_i$, and wherein a total weight is $$\delta = \sum_{i=1}^{M} \beta_i.$$

4. The exposure method of claim 1, wherein before obtaining the luminance value of the picture to be shot, the method further comprises determining, by the terminal device, a difference between the luminance value of the current environment in which shooting is to be performed and a luminance value corresponding to any one of the one or more pictures shot in advance, and wherein obtaining the luminance value of the picture to be shot comprises determining, by the terminal device, the luminance value of the current environment in which shooting is to be performed as the luminance value of the picture to be shot when the difference falls within a threshold range preset by the terminal device.

5. The exposure method of claim 4, wherein determining the difference between the luminance value of the current environment in which shooting is to be performed and the luminance value corresponding to any one of the one or more pictures shot in advance comprises determining, by the terminal device, a difference between the luminance value of the current environment in which shooting is to be performed and a luminance value corresponding to a first picture of the one or more pictures shot in advance.

6. The exposure method of claim 4, wherein determining the difference between the luminance value of the current environment in which shooting is to be performed and the luminance value corresponding to any one of the one or more pictures shot in advance comprises determining, by the terminal device, a difference between the luminance value of the current environment in which shooting is to be performed and a luminance value corresponding to a picture prior to the picture to be shot.

7. The exposure method of claim 2, wherein the luminance value adjustment coefficient α is set according to a user requirement.

8. A terminal device, comprising:
   a memory;
   a processor; and
   a bus,
   wherein the memory and the processor are coupled to the bus,
   wherein the memory is configured to store a program, and
   wherein the program causes the processor to be configured:
      obtain luminance values respectively corresponding to one or more pictures shot in advance and a luminance value of a current environment in which shooting is to be performed;
      obtain a luminance value adjustment coefficient α and adjustment weights $\beta_i$ respectively corresponding to the one or more pictures shot in advance, wherein i is a positive integer;
      obtain according to the luminance values respectively corresponding to the one or more pictures shot in advance and the luminance value of the current environment in which shooting is to be performed, a luminance value of a picture to be shot, wherein the luminance value of the picture to be shot is obtained using a difference between the luminance value of the current environment in which shooting is to be performed and a deviation coefficient that is based at least in part on the luminance value adjustment coefficient α and the adjustment weights $\beta_i$; and
      perform exposure according to the luminance value of the picture to be shot.

9. The terminal device of claim 8, wherein $0 \leq \alpha \leq 1$, and wherein $0 \leq \beta_i \leq 1$.

10. The terminal device of claim 9, wherein when obtaining the luminance value of the picture to be shot, the program further causes the processor to be configured to obtain B2 by calculation using a formula B2=B1−Δb, wherein the luminance value of the current environment in which shooting is to be performed is B1, wherein the luminance value of the picture to be shot is B2, wherein the deviation coefficient is Δb=(totalΔB/δ)×α, wherein a total adjustment value is $$\text{total}\Delta B = \sum_{i=1}^{M} \beta_i (B1 - b_i),$$

wherein the luminance values respectively corresponding to the one or more pictures shot in advance are $b_i$, and wherein a total weight is $$\delta = \sum_{i=1}^{M} \beta_i.$$

11. The terminal device of claim 8, wherein before obtaining the luminance value of the picture to be shot, the program further causes the processor to be configured to determine a difference between the luminance value of the current environment in which shooting is to be performed and a luminance value corresponding to any one of the one or more pictures shot in advance, and wherein when obtaining the luminance value of the picture to be shot, the program further causes the processor to be configured to determine the luminance value of the current environment in which shooting is to be performed as the luminance value of the picture to be shot when the difference falls within a threshold range preset by the processor.

12. The terminal device of claim 11, wherein when determining the difference between the luminance value of the current environment in which shooting is to be performed and the luminance value corresponding to any one of the one or more pictures shot in advance, the program further causes the processor to be configured to determine a difference between the luminance value of the current environment in which shooting is to be performed and a luminance value corresponding to a first picture of the one or more pictures shot in advance.

13. The terminal device of claim 11, wherein when determining the difference between the luminance value of the current environment in which shooting is to be performed and the luminance value corresponding to any one of the one or more pictures shot in advance, the program further causes the processor to be configured to determine a difference between the luminance value of the current environment in which shooting is to be performed and a luminance value corresponding to a picture prior to the picture to be shot.

14. The terminal device of claim 9, wherein the luminance value adjustment coefficient $\alpha$ is set according to a user requirement.

15. A computer program product comprising a non-transitory computer readable storage medium storing program code thereon for panoramic photo shooting, the program code comprising instructions that, when executed by a computer, cause the computer to:
obtain, by a terminal device, luminance values respectively corresponding to one or more pictures shot in advance and a luminance value of a current environment in which shooting is to be performed;
obtain a luminance value adjustment coefficient $\alpha$ and adjustment weights $\beta_i$ respectively corresponding to the one or more pictures shot in advance, wherein i is a positive integer;
obtain, by the terminal device according to the luminance values respectively corresponding to the one or more pictures shot in advance and the luminance value of the current environment in which shooting is to be performed, a luminance value of a picture to be shot, wherein the luminance value of the picture to be shot is obtained using a difference between the luminance value of the current environment in which shooting is to be performed and a deviation coefficient that is based at least in part on the luminance value adjustment coefficient $\alpha$ and the adjustment weights $\beta_i$; and
perform, by the terminal device, exposure according to the luminance value of the picture to be shot.

16. The computer program product of claim 15, wherein $0 \leq \alpha \leq 1$, and wherein $0 \leq \beta_i \leq 1$.

17. The computer program product of claim 15, wherein obtaining the luminance value of the picture to be shot comprises obtaining, by the terminal device, B2 by calculation using a formula $B2=B1-\Delta b$, wherein the luminance value of the current environment in which shooting is to be performed is B1, wherein the luminance value of the picture to be shot is B2, wherein the deviation coefficient is $\Delta b$ (total$\Delta B/\delta) \times \alpha$, wherein a total adjustment value is $$\text{total}\Delta B = \sum_{i=1}^{M} \beta_i (B1 - b_i),$$

wherein the luminance values respectively corresponding to the one or more pictures shot in advance are $b_i$, and wherein a total weight is $$\delta = \sum_{i=1}^{M} \beta_i.$$

18. The computer program product of claim 15, wherein before obtaining the luminance value of the picture to be shot, the method further comprises determining, by the terminal device, a difference between the luminance value of the current environment in which shooting is to be performed and a luminance value corresponding to any one of the one or more pictures shot in advance, and wherein obtaining the luminance value of the picture to be shot comprises determining, by the terminal device, the luminance value of the current environment in which shooting is to be performed as the luminance value of the picture to be shot when the difference falls within a threshold range preset by the terminal device.

19. The computer program product of claim 18, wherein determining the difference between the luminance value of the current environment in which shooting is to be performed and the luminance value corresponding to any one of the one or more pictures shot in advance comprises determining, by the terminal device, a difference between the luminance value of the current environment in which shooting is to be performed and a luminance value corresponding to a first picture of the one or more pictures shot in advance.

20. The computer program product of claim 18, wherein determining the difference between the luminance value of the current environment in which shooting is to be performed and the luminance value corresponding to any one of the one or more pictures shot in advance comprises determining, by the terminal device, a difference between the luminance value of the current environment in which shooting is to be performed and a luminance value corresponding to a picture prior to the picture to be shot.

* * * * *

UNITED STATES PATENT AND TRADEMARK OFFICE
CERTIFICATE OF CORRECTION

PATENT NO. : 10,462,376 B2  
APPLICATION NO. : 15/546959  
DATED : October 29, 2019  
INVENTOR(S) : Yong Wang, Yujie Chen and Lin Yang Page 1 of 1

It is certified that error appears in the above-identified patent and that said Letters Patent is hereby corrected as shown below:

In the Claims

Claim 1, Column 15, Line 15: "shot M advance," should read "shot in advance,"

Claim 1, Column 15, Line 22: "picture to he shot" should read "picture to be shot"

Signed and Sealed this
Seventeenth Day of December, 2019

Andrei Iancu
*Director of the United States Patent and Trademark Office*